United States Patent [19]

Bleckmann

[11] Patent Number: 4,558,204
[45] Date of Patent: Dec. 10, 1985

[54] ELECTRIC CONTINUOUS FLOW WATER HEATER ASSEMBLY FOR A BEVERAGE MAKING MACHINE

[76] Inventor: Ingo Bleckmann, Ignaz-Rieder-Kai 11, A-5020 Salzburg, Austria

[21] Appl. No.: 587,924

[22] Filed: Mar. 9, 1984

[51] Int. Cl.$^4$ .......... H05B 3/68; A47J 31/54; F24H 1/10
[52] U.S. Cl. ............. 219/283; 99/288; 99/304; 99/307; 219/297; 219/301; 219/436; 219/438
[58] Field of Search ........ 219/283, 301, 297, 438, 219/436; 99/302 R, 288, 281, 306, 307, 305, 304

[56] References Cited

U.S. PATENT DOCUMENTS

| 2,443,806 | 6/1948 | Shafter | 219/438 X |
| 4,095,086 | 6/1978 | Ohmmacht et al. | 219/301 X |
| 4,270,067 | 5/1981 | Thomas et al. | 219/438 |
| 4,356,381 | 10/1982 | Flaherty et al. | 219/301 X |

FOREIGN PATENT DOCUMENTS

| 2023598 | 11/1971 | Fed. Rep. of Germany. | |
| 2551779 | 5/1977 | Fed. Rep. of Germany. | |
| 2642571 | 3/1978 | Fed. Rep. of Germany. | |
| 2652656 | 5/1978 | Fed. Rep. of Germany. | |
| 2808182 | 8/1979 | Fed. Rep. of Germany | 219/283 |

Primary Examiner—Anthony Bartis
Attorney, Agent, or Firm—Mallinckrodt, Mallinckrodt, Russell & Osburn

[57] ABSTRACT

A continuous flow heater assembly for an electrically heated apparatus for producing an infusion beverage comprises a generally dish-like mounting plate carrying a tubular heater of generally annular configuration and, inside that annular configuration, a water pipe which is also of a generally annular configuration. The underside of the tubular heater and the water pipe are in heat-conducting contact with the mounting plate while the underside of a support plate for supporting a container containing a beverage bears against the tubular heater but not against the water pipe. A raised edge portion of the dish shape of the mounting plate extends at a small spacing from the adjacent side wall of the tubular heater, to a position close to the underside of the support plate. Alternatively, a guard ring may be fitted onto the space between the mounting plate and the support plate outwardly of the tubular heater to partially close the space between the plates.

14 Claims, 4 Drawing Figures

ELECTRIC CONTINUOUS FLOW WATER HEATER ASSEMBLY FOR A BEVERAGE MAKING MACHINE

BACKGROUND OF THE INVENTION

One form of electrically heated coffee making machine comprises a flat through-flow or continuous flow heater assembly which is disposed beneath a plate for supporting and warming a coffee pot and thus keeping the coffee therein hot. The heater unit comprises a tubular heater member disposed directly underneath the support and warming plate, while a water pipe for carrying a flow of water therethrough is arranged in contact with the tubular heater underneath and outside same. Although that construction has the advantage that the support plate is adequately heated by the tubular heater so that the infusion beverage, namely the coffee, is kept hot in the coffee pot which is disposed on the support plate, nonetheless the transfer of heat from the tubular heater to the water pipe is in an inclined and upward direction, that is to say, into the steam space in the water pipe. That means that the efficiency of the arrangement is substantially impaired, in regard to pushing the column of water up into a riser pipe to produce a flow of water through the coffee grains, thereby to produce the coffee. In addition, as the heated steam issues from the riser pipe, it tends to produce an unpleasant snorting noise which is often unacceptable to modern consumers. In addition, there is the further consideration that the generation of unnecessary steam, which may often be about one fifth of the quantity of water to be heated by the heater, gives rise to unnecessary consumption and thus wastage of energy, which is also unacceptable under modern-day conditions. A coffee making machine of the kind just discussed is disclosed for example in German laid-open application (DE-OS) No. 26 42 571.

In a similar form of an electrical continuous flow heater, the tubular heater and the water flow pipe are arranged one beside the other. That arrangement also provides that the flow of heat from the tubular surface to the water pipe is by way of the side surface thereof, while the predominant part of the heat is also transferred into the steam space in the water pipe, with the attendant disadvantages as referred to above. Such a construction is to be found for example in German laid-open application (DE-OS) No. 26 52 656. Other constructions of this general kind are also disclosed in German laid open applications (DE-OS) Nos. 25 51 779 and 20 23 598.

SUMMARY OF THE INVENTION

An object of the present invention is to provide an electrical continuous flow heater assembly for an electrically heated apparatus for preparing an infusion beverage, which provides a substantially enhanced level of efficiency in heating.

Another object of the present invention is to provide an electrical heater assembly for an infusion beverage making machine, which is so designed as to avoid unpleasant snorting noises as a result of discharge of steam and which provides for better energy consumption efficiency.

Yet another object of the present invention is to provide a continuous flow heater unit for an infusion beverage making machine, wherein a plastic housing thereof is protected from the radiant heat from the tubular heater thereby at least to reduce the danger of fire or burning thereof.

Still a further object of the present invention is to provide a heater assembly for an infusion beverage making machine of such a design that, in the event of the heater melting as a result of overheating, the molten metal or glowing particles of metal which may be ejected or sprayed out therefrom are caught by a particular design configuration and cannot impinge on a plastic housing of the arrangement.

These and other objects are achieved by a continuous flow heater assembly for an electrically heated machine for preparing an infusion drink comprising a mounting plate having a raised edge portion thereby defining a generally dish-like mounting arrangement. Carried on the mounting plate are a tubular heater which is of a generally annular configuration and, within the tubular heater, a water flow pipe which is also of a generally annular configuration. The underside of the tubular heater and the water pipe are connected in heat-conducting relationship to the mounting plate while the tubular heater also bears against the underneath surface of a support plate, on the top surface of which can be supported a container containing an infusion beverage. The raised edge portion of the mounting plate extends at a small spacing from the adjacent side wall surface of the tubular heater, and terminates in the vicinity of the underside of the support plate.

In a preferred embodiment, the tubular heater may be of a trapezoidal or triangular cross-section, with the wide surface of the trapezoidal configuration or the base surface of the triangular configuration bearing against the underneath surface of the support plate, and the narrower surface of the trapezoidal shape or the apex portion of the triangular shape being in contact with the mounting plate. The tubular heater is secured as by welding, brazing or soldering to the water pipe and to the mounting plate and a generally wedge-shaped gap, which decreases in width upwardly towards the support plate, is formed between the water pipe and the side wall portion of the tubular heater which is towards the water pipe, and receives a heat fusion joint In another aspect of the invention, a continuous flow heater assembly for an electrically heated machine for preparing an infusion beverage comprises a tubular heater which is of a generally annular horseshoe-like configuration, and, disposed within such configuration, a water flow pipe which is also of a generally annular configuration. The tubular heater and the water pipe are secured as by welding, brazing or soldering to a mounting plate which is of a generally dish-like configuration. The mounting plate is disposed at a spacing from a support plate for carrying a coffee pot or like beverage container, such that the unit comprising the tubular heater and the water pipe is disposed between the mounting plate and the support plate. The space between the mounting plate and the support plate, adjacent the edges thereof, is closed by a guard portion of generally annular configuration. The guard portion may be formed by an upwardly extended edge portion of the mounting plate, or by a wall portion which is bent downwardly from the support plate towards the mounting plate, or by a separate guard member which is fitted into the space between the mounting and support plates.

Further objects, features and advantages of the construction in accordance with the teaching of the present invention will be set forth in the following description of preferred embodiments thereof.

DESCRIPTION OF PREFERRED EMBODIMENTS

Figure 1:
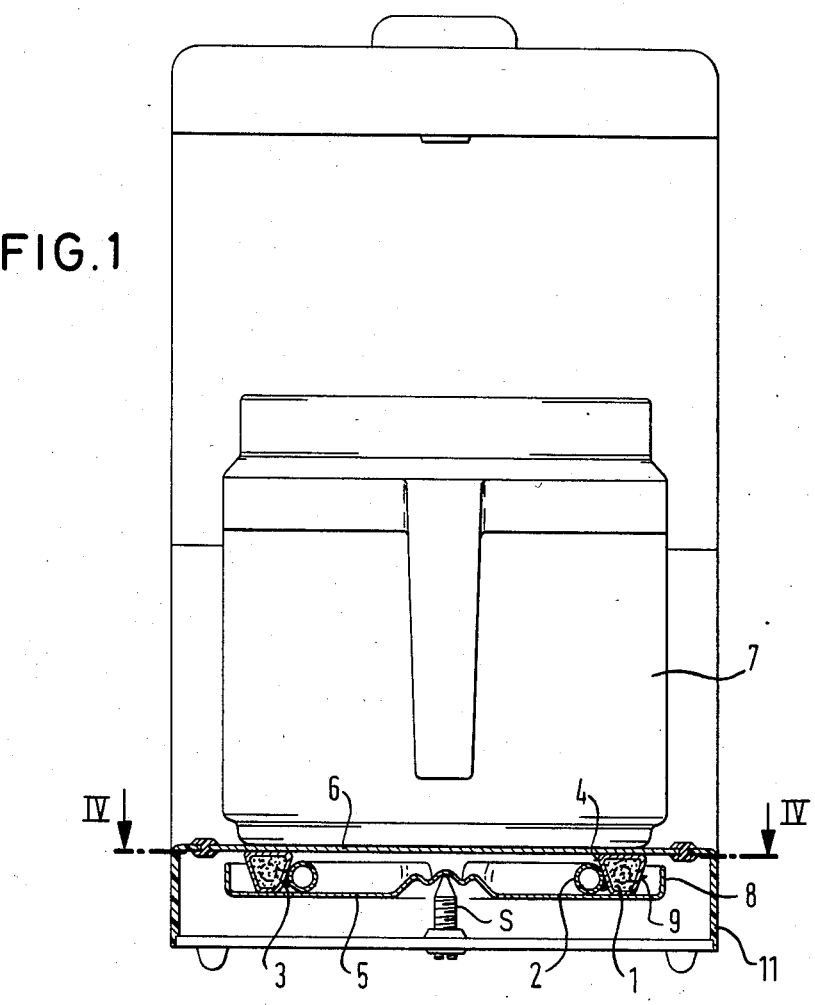
FIG. 1 is a view of a beverage making machine showing a vertical section of a first embodiment of a heater assembly in accordance with this invention.
Figure 4:
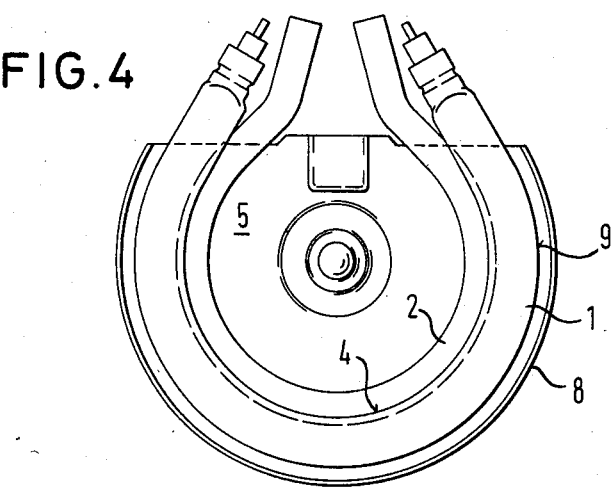
FIG. 4 shows a plan view of the heater assembly in FIG. 1, in cross-section taken along line IV—IV.

Referring firstly to FIG. 1, shown therein is a beverage making machine such as a coffee making machine which includes a continuous flow heater assembly in accordance with the present invention. The heater assembly comprises a tubular heater 1 and a water flow pipe 2, which are both of a generally annular configuration, including for example a horseshoe-shaped configuration, as can best be seen from FIG. 4. The tubular heater 1 and the water pipe 2 are secured together by a heat fusion joint, for example welding, brazing or soldering, indicated by reference numeral 3. The side surface portion 4 of the tubular heater 1, which is towards the water pipe 2, forms, with the water pipe 2, a wedge-shaped gap which decreases in width upwardly and receives the heat fusion joint 3 so that the heat generated by the electrically powered tubular heater 1 is transferred to the water pipe 2 by the heat fusion joint 3, that is to say, generally from below. The arrangement comprising the tubular heater 1 and the water pipe 2 is secured as previously indicated to a mounting plate 5 which is disposed below and at a spacing from a support and warming plate 6 for supporting and warming a coffee pot indicated at 7. The arrangement comprising the tubular heater 1 and the water pipe 2 is thus disposed between the mounting plate 5 and the support plate 6, with the undersides of the tubular heater 1 and the water pipe 2 being connected in heat-conducting relationship to the mounting plate 5, with the underside of the support plate 6 for the container 7 lying against the top surface portion of the tubular heater 1 and as illustrated, with the water pipe 2 spaced therebelow out of heat-transfer contact with the support plate 6.

The mounting plate 5 is of a generally dish-like configuration, having an edge portion 8 which is extended upwardly towards the support plate 6 so as to terminate in the vicinity of the underside thereof, the raised edge portion 8 extending at a small spacing from the oppositely disposed side wall portion 9 of the tubular heater 1. The space remaining between the inside surface of the raised edge portion 8 and the adjacent side wall portion 9 of the tubular heater is required so that the raised edge portion 8 cannot assume the same temperature as the tubular heater 1 itself. Accordingly, in the event of very severe overheating of the heater assembly, the casing of the tubular heater will melt first, with the molten metal flowing into the annular collecting trough formed by the raised edge portion 8 and the adjacent side wall portion 9 of the tubular heater 1, where the metal can collect. If arcing between the heating coil within the tubular heater casing, and the tubular heater casing itself, causes the casing to burn through at one or more spots, with the possible result of incandescent particles of material being ejected or sprayed out therefrom, the molten particles are also caught by the raised edge portion 8 of the mounting plate 5. That therefore affords protection for the housing 11 of the machine, which generally comprises a plastic material, thereby at least reducing and preferably eliminating the risk of fire or burning damage to the machine casing from such a source.

As shown in FIG. 1, the mounting plate 5 may be secured in position for example by being urged upwardly at its centre by a clamping screws, in the housing 11 of the machine, so that the flat top surface of the tubular heater 1 is pressed against the support plate 6, as mentioned above.

It will be appreciated that the embodiment just described with reference to FIG. 1 affords the advantage that the support plate 6 and thus the container or coffee pot 7 thereon, together with the drink therein, is well heated by the tubular heater 1 so that the drink, such as coffee, in the container 7, remains hot over a prolonged period of time, of perhaps several hours. Nonetheless, the flow of heat from the tubular heater 1 into the water pipe 2 is by way of the base area indicated at 3 and thus from below, giving a high level of heat transference and thus heating efficiency. A further advantage of the described construction has already been referred to above, namely that, in the event of the tubular heater 1 burning through, any material from the tubular heater casing is caught by the mounting plate 5 and thus protects the plastic housing of the machine.

The water pipe 2 and the casing of the tubular heater 1 may comprise any suitable material such as iron or aluminium. The mounting plate 5 preferably comprises an aluminium-coated steel. Such aluminiumcoated steels have the advantage on the one hand that they can be easily and satisfactorily welded or brazed, while on the other hand they have a high level of temperature resistance so that, in the event of the tubular casing of the tubular heater melting, the mounting plate itself will not melt away but will still perform its function of collecting the metal originating from the tubular heater.

It should be noted from FIG. 1 that the tubular heater is of trapezoidal cross-section wherein the wider surface of the trapezoidal cross-section bears against the underneath surface of the support plate 6 while the narrower surface of the trapezium bears against the mounting plate 5. In a modified form of that construction, the tubular heater may be of triangular cross-section, wherein the surface defined by the base of the triangle bears against the underneath surface of the support plate 6, with the apex portion of the triangle bearing against the mounting plate 5.

Figure 2:
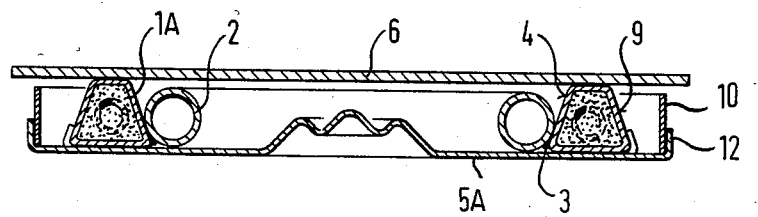
FIG. 2 shows a view in cross-section through a second embodiment of a heater assembly according to the invention.

Reference will now be made to FIG. 2 which shows another embodiment of a construction in accordance with the principles of this invention, similarly comprising a tubular heater 1A of generally annular, for example horseshoe-shaped configuration, secured to a dish-shaped mounting plate 5A, and, also secured to the mounting plate 5A and disposed within the tubular heater 1A, a water pipe 2 which is of a generally similar configuration to the tubular heater 1. In this embodiment, the tubular heater 1A is of a trapezoidal cross-section with the wider surface against the mounting plate 5A and the narrower surface bearing against the underside of the support plate 6. The tubular heater 1 and the water pipe 2 are secured together in the same manner as described above with reference to FIG. 1, at the location indicated at 3.

In the FIG. 2 construction, in place of the edge portion 8 of the mounting plate 5, which is extended upwardly to a position close to the underside of the support plate 6, the mounting plate 5A has a bent edge portion 12 and fitted inside same is a separate guard ring 10 which is in the form of a resilient spring ring. The ring 10 thus performs the guard function of preventing molten metal from the tubular heater 1A from escaping outside the confines of the space defined by the support plate 6 and the mounting plate 5A.

Figure 3:
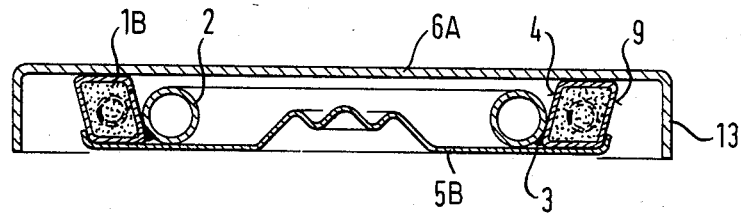
FIG. 3 shows a view in section through a third embodiment of a heater assembly according to the invention.

Reference will now be made to FIG. 3 which shows another embodiment of the heater assembly which is of the same general configuration as the heater assemblies described with reference to FIGS. 1 and 2, but with a different tubular heater cross-section. In addition, the support plate 6A for supporting the beverage container 7 is of an inverted cup-like configuration, having a downwardly extended edge portion 13, which performs the same guard and retaining function as the raised edge portion 8 in FIG. 1 and the guard ring 10 in FIG. 2.

The space between the mounting plate 5B and the support plate 6A in the construction according to the invention should not be completely closed off so that, in the event of overheating, a thermal compensation action can occur, but to a limited extent.

In principle it would be possible to envisage the water pipe being arranged on the outside with the tubular heater disposed on the inside thereof, so that the water pipe performs the guard function of the raised edge portion 8 for example as shown in FIG. 1. However, that would have the result that heat would be fed into the container or coffee pot 7 by way of an annular area which is disposed relatively far inwardly, in contrast to the illustrated constructions in which the heat is transferred to the coffee pot at the location of the tubular heater 1 and thus relatively far out radially. Arranging the tubular heater inwardly of the water pipe would therefore have the result that the further outwardly disposed part of the container would suffer from excessive cooling and would no longer be adequately warmed. In comparison with that, the illustrated constructions according to the present invention give the advantage that the tubular heater extends in the vicinity of the edge of the bottom of the coffee pot 7 so as to provide the optimum warming function.

Another advantage of the present invention is that, for a predetermined overall size of the heater assembly, the fact that the tubular heater is arranged outside the water pipe means that the tubular heater can be longer, in comparison with an arrangement in which the tubular heater is within the water pipe. That means either that, with a predetermined loading, the heating output per unit of length is less, which gives a lower surface temperature and accordingly prolongs the operating life of the heater assembly, or the loading can be increased, with the advantage that the infusion beverage is prepared more quickly and the infusion drink when prepared is kept hot in a more efficient and thus more satisfactory manner. As the water pipe, being disposed within the tubular heater, is shorter than the latter, more heat per unit of length thereof is transferred, in comparison with a construction having the water pipe on the outside. That therefore results in the machine being quiet in operation, avoiding the snorting noises which are produced with the prior-art machines referred to above.

Various other modifications and alterations may be made in the heater assembly according to the present invention without departing from the spirit and scope thereof.

What is claimed is:

1. A continuous flow heater assembly for an electrically heated apparatus for preparing an infusion beverage, comprising a thermally conductive and heat resistant mounting plate having a raised edge portion defining a generally dish-like member; a generally annularly configurated electrical heater element carried on the upper surface of the mounting plate; a generally annularly configurated water flow pipe carried on the upper surface of the mounting plate within the annular configuration of the heater element, the heater element and the water pipe being connected in heat-conducting relationship to each other and to the mounting plate; a thermally conductive support plate having an upper surface for supporting a container containing an infusion beverage, and having an undersurface disposed in contact with the heater element, and raised edge portion of said mounting plate being spaced from the adjacent side surface portion of the heater element and extending upwardly to a position adjacent but spaced from the undersurface of said support plate.

2. A heater assembly as set forth in claim 1, wherein the heater element is of trapezoidal cross-section providing a wider surface and a narrower surface, said wider surface bearing against said undersurface of said support plate and said narrower surface bearing against said mounting plate.

3. A heater assembly as set forth in claim 1, wherein said water flow pipe is spaced below the undersurface of said support plate out of heat transfer contact therewith.

4. A heater assembly as set forth in claim 1, wherein the heater element is tubular and is joined by a heat fusion-type joint to the water pipe within a gap which is of a generally wedge-like configuration and which increases towards the mounting plate, being formed between the water pipe and the side wall portion of the tubular heater element which is towards the water pipe.

5. A heater assembly as set forth in claim 1, wherein clamping means are provided to urge the said mounting plate toward the said support plate.

6. A heater assembly for an electrically heated machine for preparing an infusion beverage, comprising a tubular electrical heater element which is of a generally horseshoe-like configuration; a water flow pipe which is also of a generally horseshoe-like configuration and which is disposed within the horseshoe-like configuration of the tubular heater; a heat resistant mounting plate having a raised rim portion thereby defining a generally dishlike configuration, the tubular heater element and the water pipe being connected to each other by a heat fusion-type joint; and a heat conductive support plate, for supporting an infusion beverage container, disposed in heat-conductive contact with the upper surface of said tubular heater element and at a spacing from said mounting plate, whereby the assembly comprising said tubular heater element and said water pipe is disposed between said mounting plate and said support plate; and guard means within the space between said mounting and said support plate at least partially closing said space.

7. A heater assembly as set forth in claim 6, wherein said guard means is said raised rim portion of said mounting plate, which is the outer margin of said mounting plate bent towards said support plate.

8. A heater assembly as set forth in claim 6, wherein said guard means is provided by the tubular heater element and water flow pipe assembly.

9. A heater assembly as set forth in claim 6, wherein said guard means comprises a ring member which is fitted into said space between the mounting plate and the support plate so as to partially close same.

10. A heater assembly as set for in claim 6, wherein clamping means are provided to urge the said mounting plate toward the said support plate.

11. A heater assembly as set forth in claim 6, wherein said water flow pipe is spaced below the undersurface of said support plate out of heat-transfer contact therewith.

12. A continuous flow heater assembly for an electrically heated apparatus for preparing an infusion beverage, comprising a thermally conductive and heat resistant mounting plate; a generally annularly configured electrical heater element carried on the upper surface of the mounting plate; a generally annularly configured water flow pipe carried on the upper surface of the mounting plate within the annular configuration of the heater element, the heater and the water pipe being connected in heat-conducting relationship to each other and to the mounting plate; and a thermally conductive support plate having an upper surface for supporting a container containing an infusion beverage and an undersurface disposed in contact with the heater element, said water flow pipe being spaced below said undersurface of the support plate out of heat-transfer contact therewith.

13. A heater assembly as set forth in claim 12, wherein the heater element and the water pipe are connected to each other in heat-conducting relationship primarily along the lower portions of each so that heat is transmitted to said water pipe primarily along the lower portion thereof.

14. A heater assembly as set forth in claim 12, wherein clamping means are provided to urge the said mounting plate toward the said support plate.

* * * * *